United States Patent
Agrawal

(10) Patent No.: US 12,229,468 B1
(45) Date of Patent: Feb. 18, 2025

(54) AUTOMATIC INPUT STYLE SELECTION FOR AN EXTERNAL DISPLAY DEVICE

(71) Applicant: MOTOROLA MOBILITY LLC, Wilmington, DE (US)

(72) Inventor: Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/364,789

(22) Filed: Aug. 3, 2023

(51) Int. Cl.
  *G09G 5/00* (2006.01)
  *G06F 3/01* (2006.01)
  *G06F 3/14* (2006.01)
  *G06F 3/147* (2006.01)

(52) U.S. Cl.
  CPC ............ *G06F 3/1454* (2013.01); *G06F 3/017* (2013.01); *G06F 3/1423* (2013.01); *G06F 3/147* (2013.01)

(58) Field of Classification Search
  CPC ...... G06F 3/017; G06F 3/0484; G06F 3/1423; G06F 3/1454; G06F 3/147; H04N 21/42208
  See application file for complete search history.

(56) References Cited

U.S. PATENT DOCUMENTS

| | | | | |
|---|---|---|---|---|
| 11,120,765 | B1 * | 9/2021 | Agrawal | G06F 3/0488 |
| 11,765,215 | B2 * | 9/2023 | Agrawal | H04L 65/60 |
| | | | | 348/14.08 |
| 11,825,237 | B1 * | 11/2023 | Agrawal | G06F 3/0488 |
| 11,871,048 | B2 * | 1/2024 | Agrawal | H04N 23/62 |
| 2011/0084919 | A1 * | 4/2011 | Lee | H04N 21/42204 |
| | | | | 345/173 |
| 2020/0042274 | A1 * | 2/2020 | Park | G09G 5/12 |
| 2023/0388139 | A1 * | 11/2023 | Agrawal | G06V 10/25 |
| 2024/0114206 | A1 * | 4/2024 | Agrawal | H04N 21/454 |
| 2024/0114482 | A1 * | 4/2024 | Desai | H04L 12/2829 |

* cited by examiner

*Primary Examiner* — Joe H Cheng
(74) *Attorney, Agent, or Firm* — Isidore PLLC

(57) ABSTRACT

An electronic device, a method and a computer program product for providing a current input style and enabling a conversion of original inputs into modified inputs. The method includes identifying from device data received from an external display device, a first external display input style of the external display device and determining if the current input style of an electronic device corresponds to the first external display input style. In response to determining that the current input style of the electronic device does not correspond to the first external display input style, the method further includes converting original inputs received at the electronic device using the current input style into modified inputs corresponding to the first external display input style. The method further includes communicating the modified inputs to the external display device.

20 Claims, 6 Drawing Sheets

AUTOMATIC INPUT STYLE SELECTION FOR AN EXTERNAL DISPLAY DEVICE

BACKGROUND

1. Technical Field

The present disclosure generally relates to electronic devices and in particular to an electronic device that displays information on an external display device.

2. Description of the Related Art

Portable or hand-held electronic devices, such as cell phones and smartphones are widely used by individuals for various functions such as communication, navigation, data transmission, and entertainment. These electronic devices typically have a small display screen, which can make it difficult for users to interact with various applications and programs on the electronic device. A possible solution to the small display screen is for the user to connect the electronic device to a larger external display where information from the electronic device is displayed on the external display. Unfortunately, using an external display can cause a problem because the external display may use a different input style than the electronic device. It can be frustrating for a user to utilize an external display that does not support the input style of the electronic device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
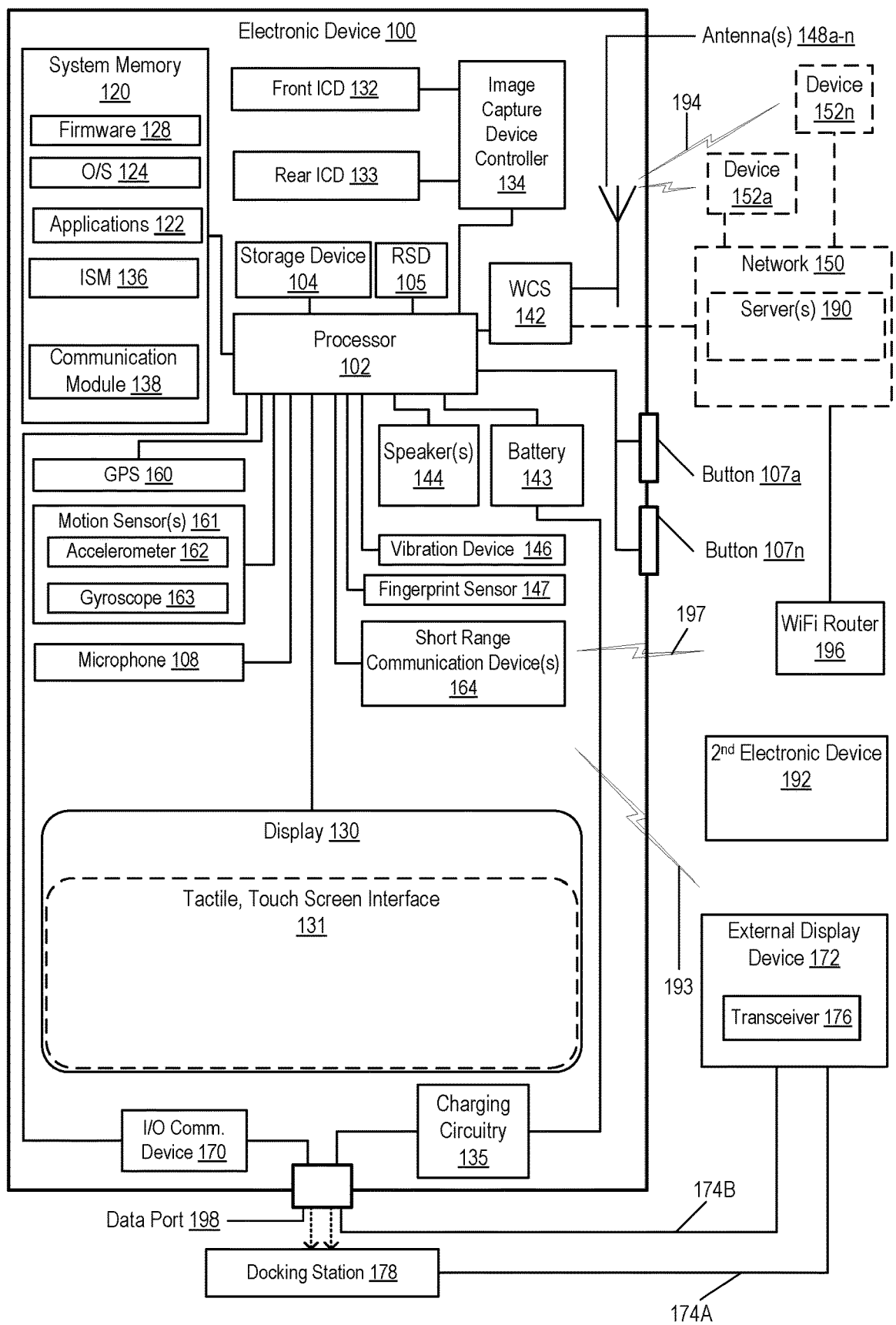
FIG. 1 depicts an example electronic device within which various aspects of the disclosure can be implemented, according to one or more embodiments.

According to one aspect of the disclosure, the illustrative embodiments provide an electronic device, a method, and a computer program product for converting original inputs into modified inputs based on the input style supported by the connected display device. In a first embodiment, an electronic device includes a communication device by which the electronic device communicatively couples to an external display device and a memory having stored thereon an input style module (ISM). The electronic device further includes at least one processor communicatively coupled to the communication device and to the memory. The at least one processor executes program code of the ISM, which enables the electronic device to identify, from device data received via the communication device, from the external display device, a first external display input style of the external display device and to determine if the current input style of the electronic device corresponds to the first external display input style of the external display device. In response to determining that the current input style of the electronic device does not correspond to the first external display input style of the external display device, the at least one processor converts original inputs received using the current input style at the electronic device into modified inputs corresponding to the first external display input style. The at least one processor generates and communicates the modified inputs to the external display device to enable use of the first external display input style during presentation of and interaction with electronic device content displayed on the external display device.

According to a second embodiment of the disclosure, the method includes identifying, via a processor, from device data received from an external display device, a first external display input style of the external display device. The method further includes determining if the current input style of an electronic device corresponds to the first external display input style of the external display device. In response to determining that the current input style of the electronic device does not correspond to the first external display input style of the external display device, the method further includes converting original inputs received using the current input style at the electronic device into modified inputs corresponding to the first external display input style. The method further includes communicating the modified inputs to the external display device to enable use of the first external display input style during presentation of and interaction with electronic device content displayed on the external display device.

According to an additional embodiment, a computer program product includes a computer readable storage device having stored thereon program code that, when executed by at least one processor of an electronic device that communicatively connects to an external display device, the program code enables the electronic device to complete the functionality of one or more of the above described methods.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example electronic device 100 within which various aspects of the disclosure can be implemented, according to one or more embodiments. Examples of such electronic devices include, but are not limited to, mobile devices, a notebook computer, a mobile phone, a smartphone, a digital camera, a smart watch, a tablet computer and a communication device, etc. It is appreciated that electronic device 100 can be other types of devices. Electronic device 100 includes processor 102. As illustrated, processor 102 is communicatively coupled to storage device 104, system memory 120, input devices, introduced below, output devices, such as display 130, and image capture device (ICD) controller 134. Processor 102 can include processor resources such as a central processing unit (CPU), one or more graphics processing units (GPU) and one or more digital signal processors (DSP) that support computing, classifying, processing, and transmitting of data and information.

ICD controller 134 is coupled to and controls operations of image capturing devices, of which front ICD 132 and rear ICD 133 are presented. For simplicity, throughout the disclosure, the term image capturing device (referencing ICD 132/133) is utilized interchangeably to be synonymous with and/or refer to any one of front or rear facing cameras (132, 133). Front facing camera (or image capture device (ICD)) 132 is communicatively coupled to ICD controller 134, which is communicatively coupled to processor 102. ICD controller 134 supports the processing of signals from front facing camera 132. Front facing camera 132 can capture images that are within the field of view (FOV) of image capture device 132. While one front facing camera 132 is shown, electronic device 100 can have more than one front facing camera.

Electronic device 100 further includes rear facing camera 133. Rear facing camera 133 is communicatively coupled to ICD controller 134, which is communicatively coupled to processor 102. ICD controller 134 supports the processing of signals from rear facing camera 133. While one rear facing camera is shown, electronic device 100 can have more than one rear facing camera.

According to one or more embodiments, ICD controller 134 performs or supports functions such as, but not limited to, selecting and activating an active camera from among multiple cameras, adjusting the camera settings and characteristics (e.g., shutter speed, f/stop, ISO exposure, zoom control, etc.) of the active camera, etc. ICD controller 134 can perform these functions in response to commands received from processor 102. In one or more embodiments, the functionality of ICD controller 134 is incorporated within processor 102, eliminating the need for a separate ICD controller. For simplicity in describing the features presented herein, the various camera selection, activation, and configuration functions performed by the ICD controller 134 are described as being provided generally by processor 102.

System memory 120 may be a combination of volatile and non-volatile memory, such as random access memory (RAM) and read-only memory (ROM). System memory 120 can store program code or similar data associated with firmware 128, an operating system 124, applications 122, input style module (ISM) 136, and communication module 138. ISM 136 includes program code that is executed by processor 102 to enable electronic device 100 to provide a current input style of the electronic device and enable a conversion of original inputs into modified inputs to match an input style of an external electronic device. Communication module 138 includes program code that is executed by processor 102 to enable electronic device 100 to communicate with other external devices and systems.

Although depicted as being separate from applications 122, ISM 136, and communication module 138 may be each implemented as an application. Processor 102 loads and executes program code stored in system memory 120 including program code associated with applications 122, ISM 136, and communication module 138.

In one or more embodiments, electronic device includes removable storage device (RSD) 105, which is inserted into an RSD interface (not shown) that is communicatively coupled via system interlink to processor 102. In one or more embodiments, RSD 105 is a non-transitory computer program product or computer readable storage device. RSD 105 may have a version of ISM 136 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touchscreen device, display 130 includes a tactile, touchscreen interface 131 that allows a user to provide input to or to control electronic device 100 by touching features presented within/below the display screen. Tactile, touch screen interface 131 can be utilized as an input device.

In one or more embodiments, tactile, touch screen interface 131 supports a gesture-based input style and a non-gesture-based input style. The gesture-based input style refers to receiving user inputs that are gestures on tactile, touch screen interface 131, such as a finger swipe, a finger touch and hold, and a multi-finger swipe or movement. The non-gesture-based input style refers to receiving user inputs that are not gestures. In an example non-gesture-based input style embodiment, a user can select one or more buttons (e.g., pressing a virtual button or pressing a physical button). The buttons in a non-gesture-based input style can be virtual buttons displayed on tactile, touch screen interface 131 and are selected by tapping on the virtual button. The virtual buttons are activated if pressed. In another example non-gesture-based input style embodiment, a virtual keyboard can be shown on display 130. The virtual keyboard can include virtual characters that can be individually selected by a user tapping the corresponding virtual character.

Electronic device 100 further includes one or more input devices such as physical input buttons 107a-107n. Input buttons 107a-107n can provide controls for volume, power, and image capture device 132. In one embodiment, one or more of physical input buttons 107a-107n can also be used to enable the non-gesture-based input style.

Electronic device 100 can further include data port 198, charging circuitry 135, and battery 143. Electronic device 100 further includes microphone 108, and one or more output devices such as speakers 144. Microphone 108 can also be referred to as audio input device 108. Microphone 108 can also be referred to generally as an input device.

Electronic device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency (RF) front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150. In one embodiment, communication network devices 152a-152n contain electronic communication equipment to allow communication with electronic device 100.

Wireless network 150 further allows electronic device 100 to wirelessly communicate with second electronic device 192 which can be similarly connected to wireless network 150 via one of network communication devices 152a-152n. In one or more embodiment, wireless network 150 can include one or more servers 190 that support exchange of wireless data and video and other communication between electronic device 100 and electronic device 192.

Electronic device 100 further includes short range communication device(s) 164, which is communicatively coupled to processor 102. Short range communication device(s) 164 is/are low powered transceiver(s) that can wirelessly communicate with other devices. Short range communication device 164 can include one or more of a variety of devices, such as a near field communication (NFC) device, a Bluetooth device, and/or a wireless fidelity (Wi-Fi) device. Short range communication device 164 can wirelessly communicate with WiFi router 196 via communication signals 197. In one embodiment, electronic device 100 can receive Internet or Wi-Fi based calls via short range communication device 164. In one embodiment, electronic device 100 can communicate with WiFi router 196 wirelessly via short range communication device 164. In an embodiment, WCS 142, antennas 148a-148n and short-range communication device(s) 164 collectively provide communication interface(s) of electronic device 100. These communication interfaces enable electronic device 100 to communicatively connect to at least one second electronic device 192 via at least one network. Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to network 150.

Electronic device 100 further includes input/output (I/O) communication device 170. I/O communication device 170 is communicatively coupled to processor 102 and to data port 198. I/O communication device 170 supports communications between electronic device 100 and other external devices that are connected to data port 198. In one embodiment, I/O communication device 170 can use a standard interface such as the universal serial bus (USB) interface to communicate with other external devices.

Electronic device 100 can communicate with an external display device 172 using either short range communication device 164, which supports a wireless connection, or I/O communication device 170, which supports a wired connection. Electronic device 100 can be removably connected to external display device 172 via a docking station 178 and an electrical cable 174A. In an alternate embodiment, electronic device 100 can communicate directly with external display device 172 via I/O communication device 170 and electrical cable 174B. Electronic device 100 can also wirelessly communicate with external display device 172 via short range communication device 164. External display device 172 can include a transceiver 176. Short range communication device 164 can wirelessly communicate with transceiver 176 via communication signals 193.

External display device 172 can be a variety of display devices. External display device 172 can be a standalone display device or can be part of another electronic device (e.g., a laptop computer or tablet computer). Examples of external display devices include, but are not limited to, a computer monitor, an all-in-one computer, a tablet computer, and a laptop computer. External display device 172 can be any suitable type of display including a liquid crystal display (LCD), and an organic light emitting diode (OLED) display.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an incoming call or message in order to provide an alert or notification to a user of electronic device 100. According to one aspect of the disclosure, display 130, speakers 144, and vibration device 146 can generally and collectively be referred to as output devices.

Fingerprint sensor 147 can be used to provide biometric data to identify or authenticate a user. GPS device 160 can provide time data and location data about the physical location of electronic device 100 using geospatial input received from GPS satellites.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100.

In the description of each of the following figures, reference is also made to specific components illustrated within the preceding figure(s). Similar components are presented with the same reference number.

Figure 2:
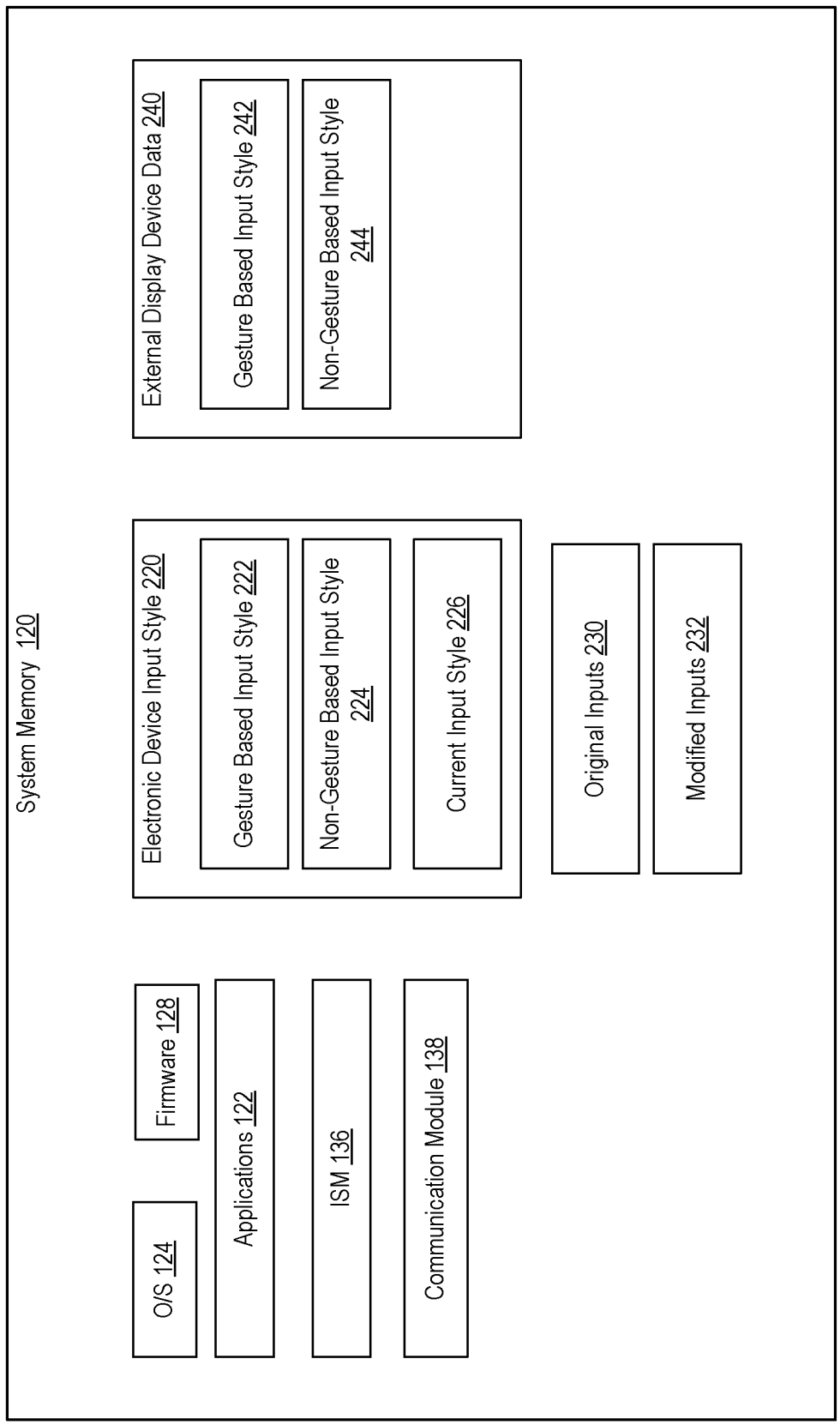
FIG. 2 is a block diagram of example contents of the system memory of the example electronic device of FIG. 1, according to one or more embodiments.

Referring to FIG. 2, there is shown one embodiment of example contents of system memory 120 of electronic device 100. System memory 120 includes data, software, and/or firmware modules, including applications 122, operating system 124, firmware 128, ISM 136, and communication module 138.

ISM 136 includes program code that is executed by processor 102 to enable electronic device 100 to perform various features of the present disclosure. In one or more embodiments, ISM 136 enables electronic device 100 to provide a current input style of the electronic device and enable a conversion of original inputs into modified inputs to match an input style of an external electronic device. In one or more embodiments, execution of ISM 136 by processor 102 enables/configures electronic device 100 to perform the processes presented in the flowcharts of FIGS. 4 and 5, as will be described below.

Communication module 138 enables electronic device 100 to communicate with wireless network 150 and with other devices, such as second electronic device 192, and external display device 172 via one or more of audio, text, image and video communications.

System memory 120 further includes electronic device input style 220. Electronic device input style 220 comprises gesture-based input style 222, non-gesture-based input style 224, and current input style 226. The current input style 226 used by electronic device 100 is one of gesture-based input style 222 and non-gesture-based input style 224. Gesture-based input style 222 are user inputs that are gestures on/above tactile, touch screen interface 131 such as a finger swipe, a finger touch and hold, and a multi-finger swipe or movement. Non-gesture-based input style 224 are user inputs that are not gestures such as pressing a virtual button or pressing a physical button. Non-gesture-based input style 224 can be provided by a user via one or more virtual buttons on tactile, touch screen interface 131 or via buttons 107a-107n.

System memory 120 further includes original inputs 230 and modified inputs 232. Original inputs 230 are inputs provided to electronic device 100 by a user of electronic device 100. Modified inputs 232 are original inputs received using the original input style that have been converted from the input style of the original inputs to a different input style of a connected display device. The original inputs 230 can be either of one the gesture-based input style 222 or the non-gesture-based input style 224. The corresponding modified inputs 232 can then be either one of the gesture-based input style 222 or the non-gesture-based input style 224 that aligns with the input style of the connected display device.

Electronic device 100 can receive external display device data 240 from an external display device 172 and determine if the current input style 226 of electronic device 100 matches the input style (e.g., one of gesture-based input style 242 or non-gesture-based input style 244) of the external display device 172. If the current input style 226 of electronic device 100 matches the input style of external display device 172, electronic device 100 provides the original inputs 230 to external display device 172. If the current input style 226 of electronic device 100 does not match the input style of external display device 172, electronic device 100 converts the original inputs 230 into modified inputs 232 to match the input style of external display device 172 and provides the modified inputs 232 to external display device 172.

System memory 120 further includes external display device data 240. External display device data 240 is received from external display device 172. External display device data 240 comprises one or both of gesture-based input style 242 and non-gesture-based input style 244.

Figure 3A:
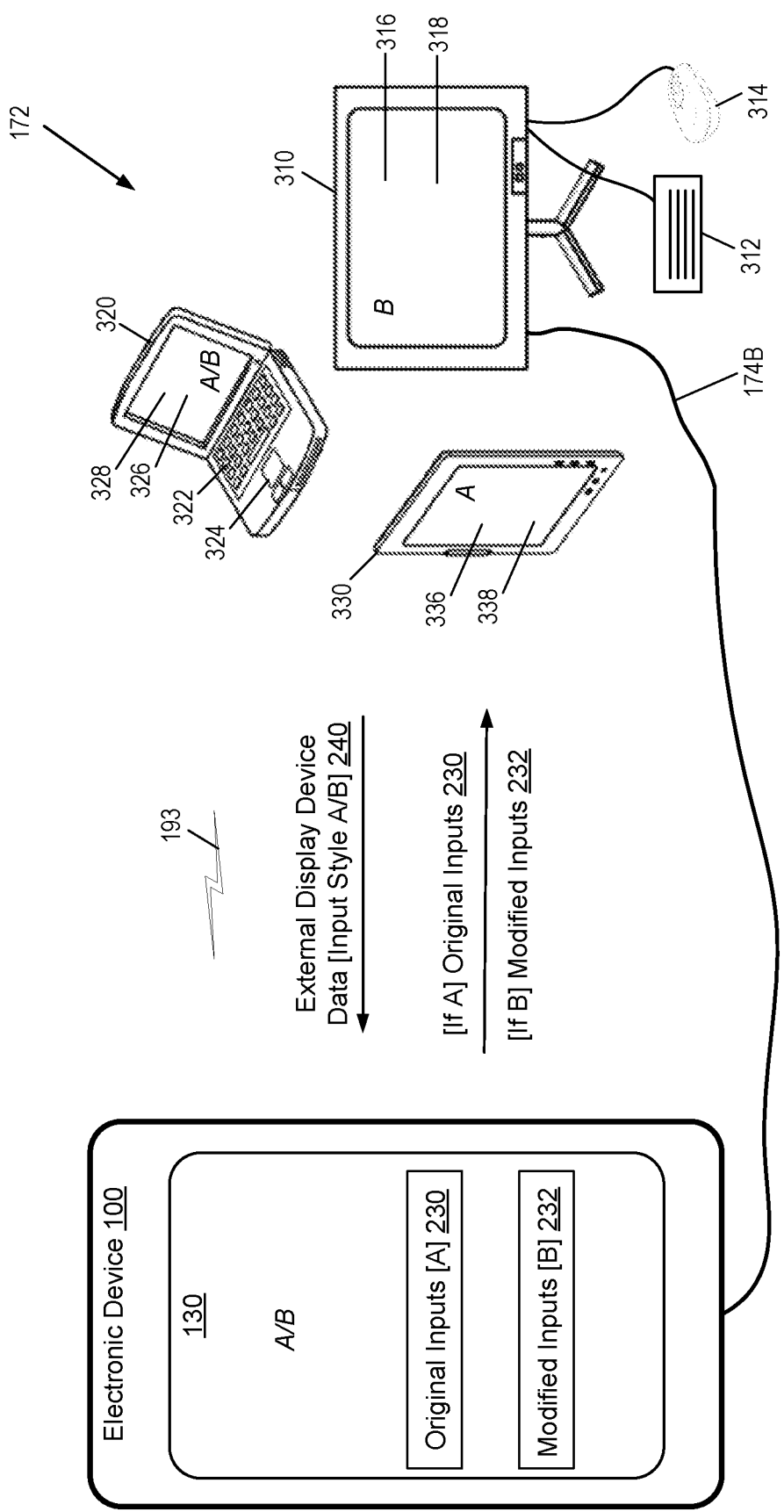
FIG. 3A is an example illustration of the example electronic device of FIG. 1, communicating with one or more external display devices, according to one or more embodiments.

With reference to FIG. 3A, electronic device 100 is shown communicating with several examples of external display devices 172. A user of electronic device 100 may desire to view content on a larger display size than the display size of electronic device 100 and can utilize the larger display size of external display devices 172 to view content originating from electronic device 100. In one embodiment, the external display device can be a standalone display device 310. Standalone display device 310 can be an electronic device that includes a keyboard 312, a pointing device 314, such as a mouse, and a display 316 with a tactile touch screen interface 318. A user of standalone display device 310 can provide non-gesture type inputs [B] to standalone display device 310 using the non-gesture-based input style 244, via keyboard 312 and pointing device 314. In a non-gesture-based input style mode, user interfacing with the standalone display device 310 is based on inputs to keyboard 312 and pointing device 314. In another embodiment, keyboard 312 and/or pointing device 314 do not need to be attached to the display by a cable and can wirelessly communicate with standalone display device 310 via a short range wireless signal such as Bluetooth.

In another embodiment, external display device can be a laptop computer 320. Laptop computer 320 can include a keyboard 322, a pointing device 324 such as a touchpad, and a display 326 with a tactile touch screen interface 328. A user of laptop computer 320 can provide gesture type inputs [A] to laptop computer 320 using the gesture-based input style 242, via tactile touch screen interface 328, and can provide non-gesture type inputs [B] using the non-gesture-based input style 244, via keyboard 322 and pointing device 324.

In an additional embodiment, external display device can be a tablet computer 330. Tablet computer 330 can include a display 336 with a tactile touch screen interface 338. A user of tablet computer 330 can provide gesture type inputs [A] to tablet computer 330 using the gesture-based input style 242, via tactile touch screen interface 338.

Electronic device 100 can communicate with any of external display devices 172 via one or both of a wireless signal 193 or a wired connection using an electrical cable 174B and optionally docking station 178. In FIG. 3A, only standalone display device 310 is shown connected to electronic device 100 using an electrical cable 174B. In other embodiments, laptop computer 320 and tablet computer 330 may also be connected to electronic device 100 using an electrical cable.

An electronic device user of electronic device 100 can provide original inputs [A] 230 to electronic device 100. The original inputs [A] 230 can be in the gesture-based input style 222 or the non-gesture-based input style 224. Electronic device 100 can receive external display device data 240 from an external display device 172. In one embodiment, device input-style data (i.e., external display device data [input style A/B] 240) can be automatically transmitted from the memory of the external display device 172 during a connection of the devices. For example, a handshake process between electronic device 100 and external display device 172 enables the initiation of inter-device communication exchange. Alternatively, electronic device 100 can transmit a request for the device input-style data (i.e., external display device data [input style A/B] 240) if the device input-style data is not automatically received during the communication setup/handshake.

Electronic device 100 determines if the current input style 226 of electronic device 100 matches the input style (e.g., one of gesture-based input style 242 or non-gesture-based input style 244) of the external display device 172. If the current input style 226 of electronic device 100 matches the input style of external display device 172, electronic device 100 provides (transmits) the original inputs [A] 230 to external display device 172. If the current input style 226 of electronic device 100 does not match the input style of external display device 172, electronic device 100 converts the original inputs [A] 230 into modified inputs [B] 232 to match the input style of external display device 172 and provides (transmits) the modified inputs [B] 232 to external display device 172.

According to one aspect of the disclosure, electronic device 100 can identify a first external display input style (e.g., one of gesture-based input style 242, or non-gesture-based input style 244) of the external display device 172 from device data 240 received from external display device 172, via communication device 164 and/or 170. Electronic device 100 determines if the current input style 226 of electronic device 100 corresponds to the first external display input style of the external display device 172. In response to determining that the current input style 226 of electronic device 100 does not correspond to the first external display input style of the external display device 172, electronic device 100 converts original inputs [A] 230 received at electronic device 100 using the current input style 226 into modified inputs [B] 232 (e.g., one of gesture-based input style 222, or non-gesture-based input style 224) corresponding to the first external display input style. Electronic device 100 communicates the modified inputs [B] 232 to the external display device 172 to enable use of the first external display input style during presentation of and interaction with electronic device content displayed on the external display device 172. In one embodiment, the gesture-based input style 222 can include different types of gesture-based input styles such as a finger swipe, a finger touch and hold, and a multi-finger swipe or movement. Each of the different types of gesture-based input styles can be separately identified and converted into corresponding non-gesture based input styles.

According to another aspect of the disclosure, when electronic device 100 is communicatively coupled or connected to an external display device 172, electronic device 100 can automatically identify the input style (e.g., one of gesture-based input style 242, or non-gesture-based input style 244) being used by the external display device 172. Electronic device 100 can automatically match the input style of external display device 172 by converting original inputs [A] 230 at electronic device 100 to modified inputs [B] 232 using one of gesture-based input style 222, or non-gesture-based input style 224 and provide the modified inputs [B] 232 to external display device 172.

In one example embodiment, the current input style 226 of electronic device 100 can be the gesture-based input style 222 and the input style of external display device 172 can be the non-gesture-based input style 244. Electronic device 100 can convert the original inputs [A] 230 received in the gesture-based input style 222 at electronic device 100 to modified inputs [B] 232 in the non-gesture-based input style and provide the modified inputs [B] 232 to external display device 172.

In another example embodiment, the current input style 226 of electronic device 100 can be the non-gesture-based input style 224 and the input style of external display device 172 can be the gesture-based input style 242. Electronic device 100 can convert the original inputs [A] 230 received in the non-gesture-based input style 224 at electronic device

100 to modified inputs [B] 232 in the gesture-based input style and provide the modified inputs [B] 232 to external display device 172.

According to one aspect of the disclosure, when electronic device 100 is communicatively coupled or connected to an external display device 172, electronic device 100 continues to use the same current input style 226, as selected by a user of electronic device 100, and electronic device 100 automatically provides inputs (i.e., original inputs 230 or modified inputs 232) to match the input style of the external display device 172. Thus, the current input style 226, as selected by a user of electronic device 100, is independent of and not affected by the input style of the external display device 172.

According to another aspect of the disclosure, if electronic device 100 determines that external display device 172 is operating in the gesture-based input style and electronic device 100 is operating in the non-gesture-based input style, electronic device 100 automatically converts the original inputs [A] 230, in the non-gesture-based input style, to modified inputs [B] 232, in the gesture-based input style and provides the modified inputs [A] 232 to external display device 172. If electronic device 100 determines that external display device 172 is operating in the non-gesture-based input style and electronic device 100 is operating in the gesture-based input style, electronic device 100 automatically converts the original inputs [A] 230, in the gesture-based input style, to modified inputs [B] 232, in the non-gesture-based input style and provides the modified inputs [B] 232 to external display device 172.

Figure 3C:
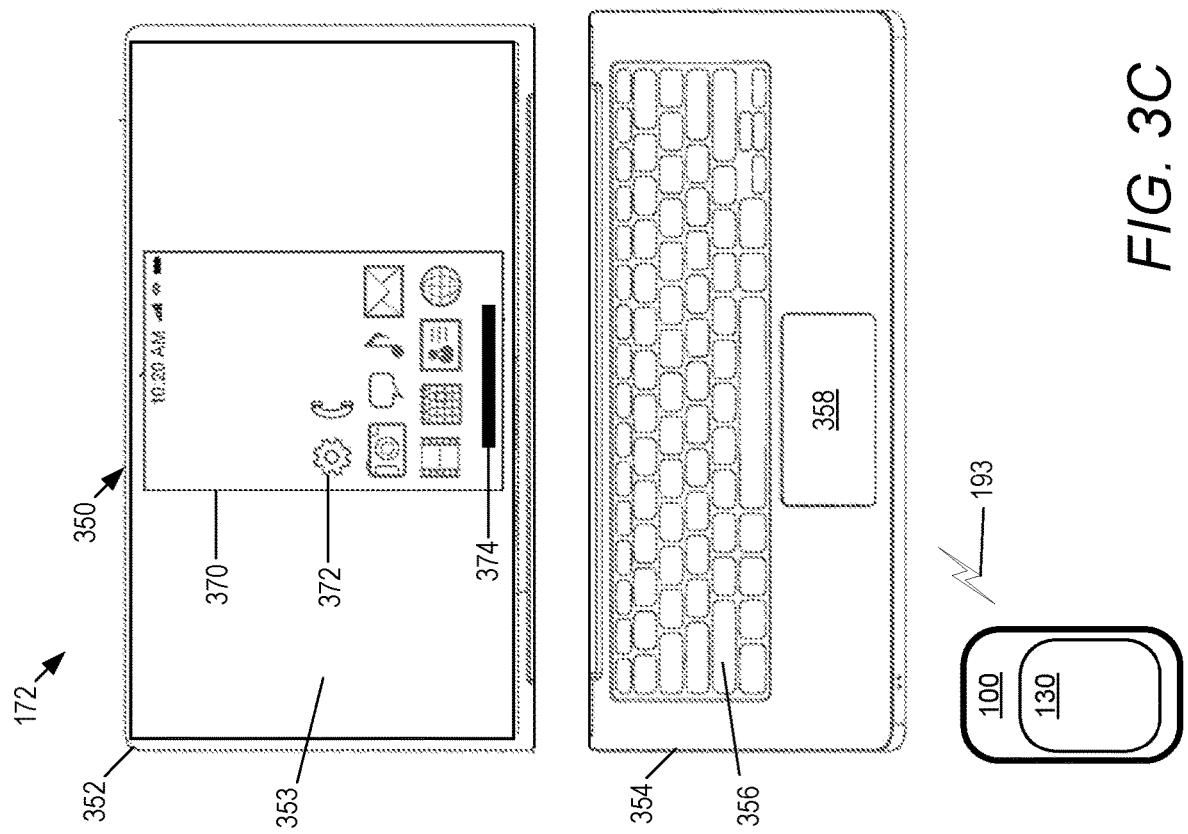
FIG. 3C is an example illustration of an external display device with a detachable keyboard that has been detached from the display, communicating with the example electronic device of FIG. 1, according to one or more embodiments.
Figure 3B:
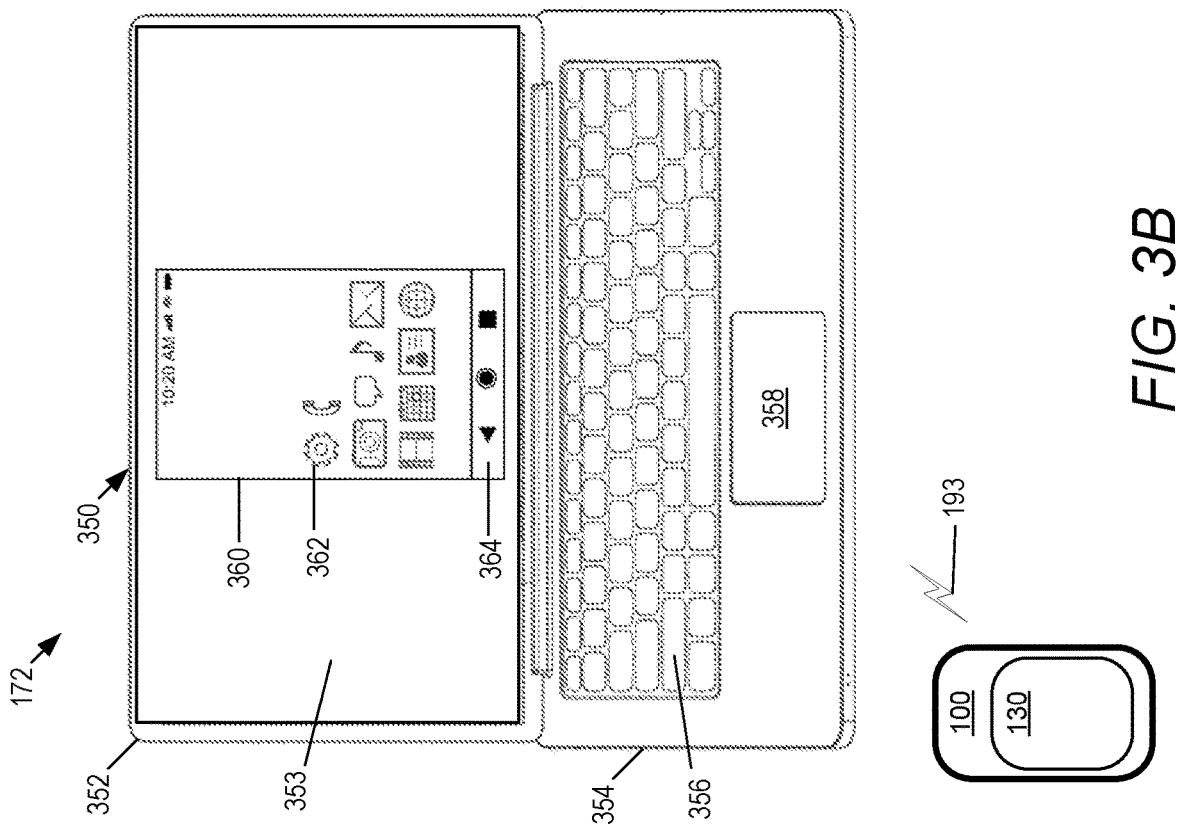
FIG. 3B is an example illustration of an external display devices with a detachable keyboard that is attached to the display communicating with the example electronic device of FIG. 1, according to one or more embodiments.

Referring to FIG. 3B, another example of an external display device 172 is shown wirelessly receiving content from a connected electronic device 100. In one embodiment, the external display device can be a tablet computer 350 with a display 352 and a detachable keyboard 354. Display 352 can include a tactile touch screen interface 353. Detachable keyboard 354 includes a set of keys 356 and a pointing device 358, such as a touchpad. With the detachable keyboard 354 connected to tablet computer 350, the external display device is operating in the non-gesture-based input style 244. In another embodiment, keyboard 354 does not need to be physically attached to display 352 and can wirelessly communicate with display 352 via a short range wireless signal such as Bluetooth.

The display 352 is shown displaying content from electronic device 100 including a graphical user interface (GUI) 360 that contains multiple icons 362. GUI 360 also includes a button bar 364 indicating that electronic device 100 is providing outputs in the non-gesture-based input style. Button bar 364 includes various buttons that can be selected to perform various operations supporting the gesture-based input style. In one embodiment, button bar 364 includes a triangle button (e.g., selectable to navigate back one step or screen), a circle button (e.g., selectable to navigate to a home screen or desktop view), and a square button (e.g., selectable to show all currently running applications).

Electronic device 100 can be operating in either the gesture-based input style 222 or the non-gesture-based input style 224. If electronic device 100 determines that external display device 172 (i.e., tablet computer 350) is operating in the non-gesture-based input style and electronic device 100 is operating in the gesture-based input style, electronic device 100 automatically converts the original inputs 230, in the gesture-based input style, to modified inputs 232, in the non-gesture-based input style and provides the modified inputs 232 to the external display device. Electronic device 100 provides outputs to display 352 that match the current input style of the external display device (i.e., the non-gesture-based input style) as shown by button bar 364 of GUI 360. In other words, content received from electronic device 100 is viewed as the non-gesture-based navigation style when the external display device is enabled to use a non-gesture based input style.

Referring to FIG. 3C, another example of an external display device 172 is shown wirelessly receiving content from a connected electronic device 100. With the detachable keyboard 354 detached from tablet computer 350, the external display device is operating in the gesture-based input style 242 via touch screen interface 353.

The display 352 is shown displaying content from electronic device 100 including a graphical user interface (GUI) 370 that contains multiple icons 372. GUI 370 also includes a gesture navigation bar 374 that indicates that electronic device 100 is providing outputs in the gesture-based input style. In one embodiment, gesture navigation bar 374 enables input in the gesture-based input style including swiping from up from the bottom of the electronic device display 130 to navigate to a home screen, swiping across the bottom of the electronic device display 130 to switch applications, and swiping from either side of the electronic device display 130 to navigate back one step or screen.

Electronic device 100 can be operating in either the gesture based input style 222 or the non-gesture-based input style 224. If electronic device 100 determines that external display device 172 (i.e., tablet computer 350) is operating in the gesture-based input style and electronic device 100 is operating in the non-gesture-based input style, electronic device 100 automatically converts the original inputs 230, in the non-gesture-based input style, to modified inputs 232, in the gesture-based input style and provides the modified inputs 232 to the external display device. Electronic device 100 provides outputs to display 352 that match the current input style of the external display device (i.e., the gesture-based input style) as shown by gesture navigation bar 374. In other words, content received from electronic device 100 is viewed as the gesture-based navigation style when the external display device is enabled to use a gesture-based input style.

Figure 4:
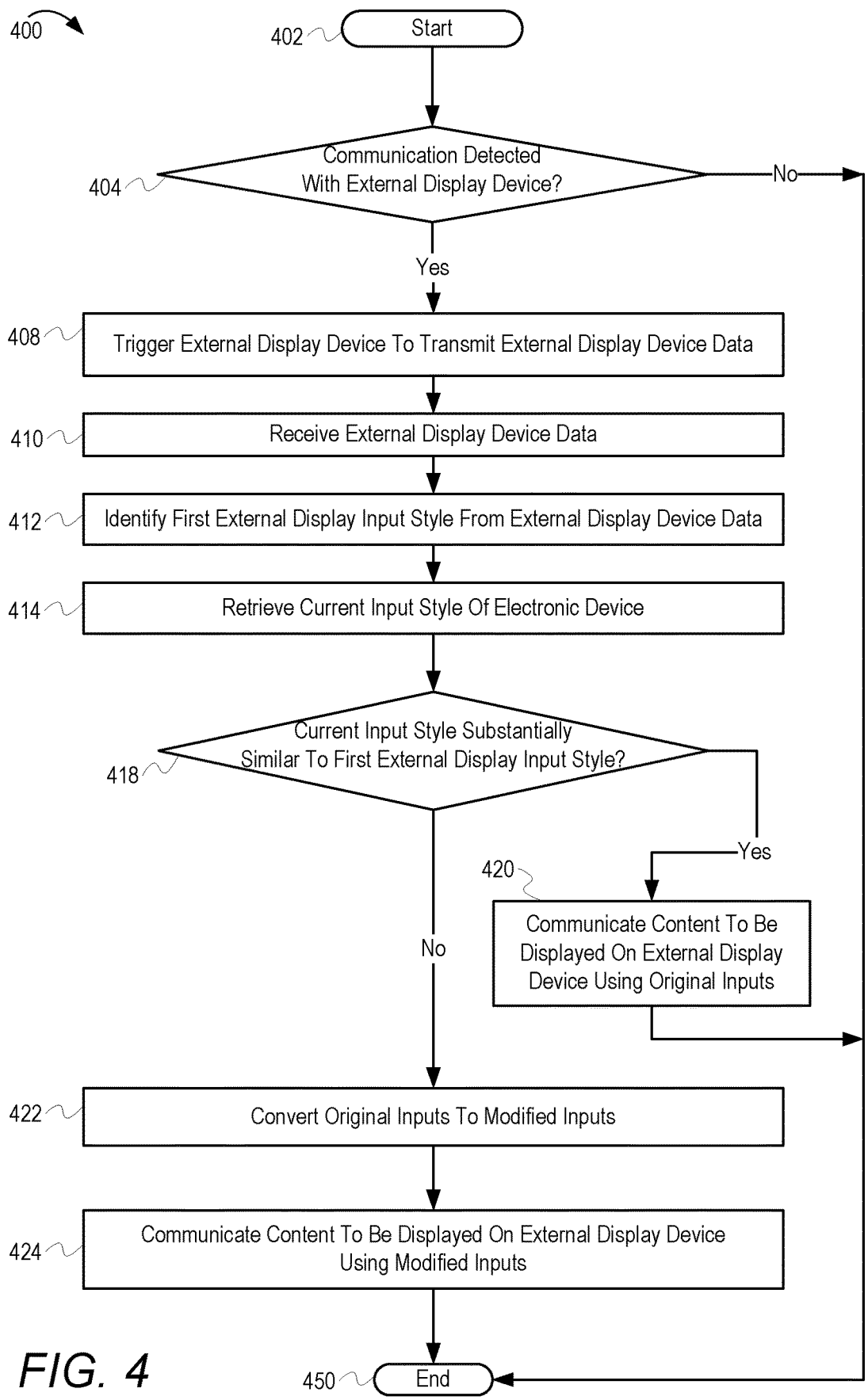
FIG. 4 depicts a flowchart of a method by which an electronic device converts original inputs received at the electronic device into modified inputs to match an input style of a connected external electronic display, according to one or more embodiments.
Figure 5:
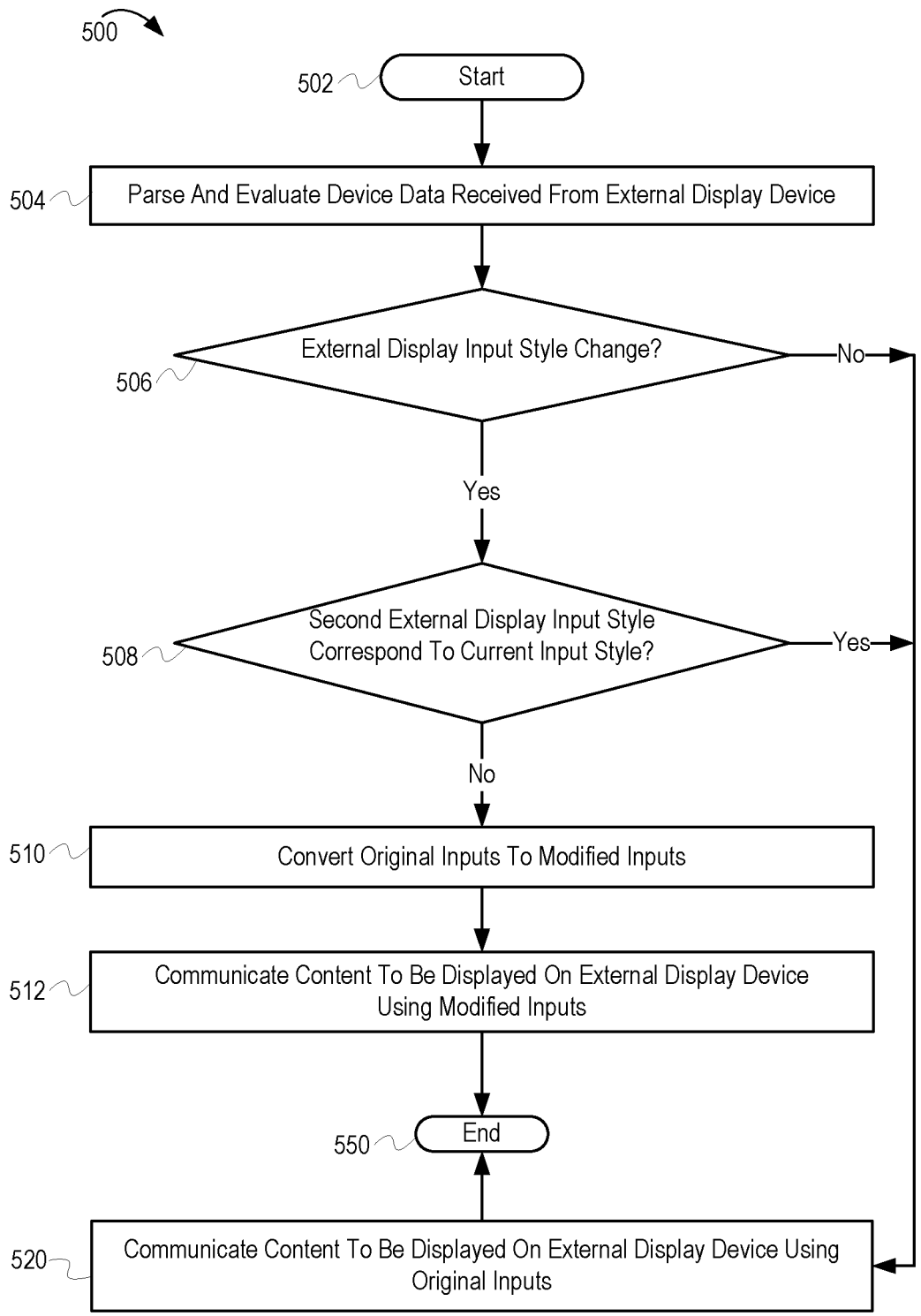
FIG. 5 depicts a flowchart of a method by which an electronic device monitors and adjusts to an input style of an external display device, according to one or more embodiments.

Turning now to the flow charts, FIG. 4 depicts method 400 by which electronic device 100 converts of original inputs into modified inputs to match an input style of an external electronic device. FIG. 5 depicts method 500 by which electronic device 100 monitors an input style of an external display device and adjusts the style of the communicated inputs accordingly. The description of methods 400 and 500 will be described with reference to the components and examples of FIGS. 1-3C.

The operations depicted in FIGS. 4 and 5 can be performed by electronic device 100 or any suitable electronic device that includes the one or more functional components of electronic device 100 that provide/enable the described features. One or more of the processes of the methods described in FIGS. 4 and 5 may be performed by processor 102 executing program code associated with ISM 136.

With specific reference to FIG. 4, method 400 begins at start block 402. At decision block 404, processor 102 determines if communication has been detected with at least one external display device 172. Processor 102 can communicate with external display devices 172 via a wired connection using I/O communication device 170 and an electrical cable 174B or wirelessly via short range communication device 164, wireless signal 193 and transceiver 176. In response to determining that communication has not been detected with at least one external display device 172, method 400 ends at end block 450.

In response to determining that communication has been detected with at least one external display device 172, processor 102 triggers the external display device 172 to transmit external display device data 240 including the first external display input style (e.g., one of gesture-based input style 242, or non-gesture-based input style 244) to the electronic device 100 (block 408). Processor 102 receives the external display device data 240 from external display device 172 (block 410).

Processor 102 identifies, from the external display device data 240, a first external display input style (e.g., one of gesture-based input style 242, or non-gesture-based input style 244) (block 412). Processor 102 retrieves current input style 226 from system memory 120 (block 414).

Processor 102 determines if the current input style 226 matches or corresponds to the first external display input style (decision block 418). In response to determining that the current input style 226 corresponds to the first external display input style of the external display device 172, processor 102 communicates the original inputs 230 received at electronic device 100 to the external display device 172 to enable use of the first external display input style during presentation of and interaction with electronic device content displayed on the external display device 172 (block 420). Method 400 then terminates at end block 450.

In an example embodiment, if the first external display input style is the gesture-based input style 242, and the current input style 226 is the gesture-based input style 222, processor 102 communicates content using the original inputs 230 to the external display device 172.

In response to determining that the current input style 226 does not correspond to the first external display input style of the external display device 172, processor 102 converts the original inputs 230 received at electronic device 100 using the current input style 226 into modified inputs 232 corresponding to the first external display input style (e.g., one of gesture-based input style 242, or non-gesture-based input style 244) (block 422).

Processor 102 communicates the modified inputs 232 to the external display device 172 to enable use of the first external display input style during presentation of and interaction with electronic device content displayed on the external display device 172 (block 424). Method 400 ends at end block 450.

In an example embodiment, if the first external display input style is the non-gesture-based input style 244, and the current input style 226 is the gesture-based input style 222, processor 102 converts the original inputs 230 to modified inputs 232 based on the non-gesture-based input style 224 of electronic device 100 and communicates content using the modified inputs 232 to the external display device 172. In one embodiment, the gesture-based input style 222 can include different types of gesture-based input styles such as a finger swipe, a finger touch and hold, and a multi-finger swipe or movement. Each of the different types of gesture-based input styles can be separately identified and converted into corresponding non-gesture based input styles.

In another example embodiment, if the first external display input style is the gesture-based input style 242, and the current input style 226 is the non-gesture-based input style 224, processor 102 converts the original inputs 230 to modified inputs 232 based on the gesture-based input style 222 of electronic device 100 and communicates content using the modified inputs 232 to the external display device 172.

FIG. 5 illustrates method 500 by which electronic device 100 monitors an input style of an external display device and adjusts the style of the communicated inputs. With specific reference to FIG. 5, method 500 begins at start block 502. Processor 102 periodically triggers and receives external display device data 240 from external display device 172 to monitor for changes in the external display input style. At block 504, processor 102 parses and evaluates the external display device data 240 received from external display device 172.

Processor 102 determines if the first external display input style (e.g., one of gesture-based input style 242, or non-gesture-based input style 244) has changed to a different second external display input style (e.g., one of gesture-based input style 242 or non-gesture-based input style 244) (decision block 506). In response to determining that the first external display input style has not changed to a different second external display input style, processor 102 communicates the original inputs 230 to the external display device 172 to enable use of the first external display input style during presentation of and interaction with electronic device content displayed on the external display device 172 (block 520). Method 500 then terminates at end block 550.

In response to determining that the first external display input style has changed to a different second external display input style, processor 102, determines if the second external display input style corresponds to the current input style 226 of electronic device 100 (decision block 508).

In response to determining that the second external display input style corresponds to the current input style 226 of electronic device 100, processor 102 communicates the original inputs 230 to the external display device 172 to enable use of the first external display input style during presentation of and interaction with electronic device content displayed on the external display device 172 (block 520). Method 500 then terminates at end block 550.

In response to determining that the second external display input style does not correspond to the current input style 226 of electronic device 100, processor 102 converts the original inputs 230 received at the electronic device 100 using the current input style 226 into modified inputs 232 corresponding to the second external display input style (block 510). Processor 102 communicates the modified inputs 232 to the external display device 172 to enable use of the second external display input style during presentation of and interaction with electronic device content displayed on the external display device 172 (block 512). Method 500 ends at end block 550.

According to one aspect of the disclosure, the first external display input style can initially be the gesture-based input style 242. Processor 102 monitors if the first external display input style (e.g. gesture-based input style 242) changes to a second external display input style (e.g. non-gesture-based input style 244). In response to the gesture-based input style 242 being changed to the non-gesture-based input style 244 at external display device 172, processor 102 determines if the second external display input style (e.g. non-gesture-based input style 244) corresponds to the current input style 226 (i.e., non-gesture-based input style 224) of the electronic device 100. In response to determining that the non-gesture-based input style 244 does not correspond to the current input style 226 (i.e., non-gesture-based input style 224), processor 102 converts the original inputs 230 received at the electronic device using the current input style 226 into modified inputs 232 (i.e., gesture-based input style 222) corresponding to the second external display input style (e.g. non-gesture-based input style 244). Processor 102 communicates the modified inputs 232 to the external display device 172 to enable use of the second external display input style (e.g. non-gesture-based input style 244) during presentation of and interaction with electronic device content displayed on the external display device 172.

In the above-described methods of FIGS. 4 and 5, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a communication device by which the electronic device communicatively couples to an external display device;
a memory having stored thereon an input style module (ISM) providing a current input style of the electronic device and enabling a conversion of original inputs into modified inputs; and
at least one processor communicatively coupled to the communication device and to the memory, the at least one processor executing program code of the ISM, which enables the electronic device to:
identify, from device data received from the external display device via the communication device, a first external display input style of the external display device;

determine if the current input style of the electronic device corresponds to the first external display input style of the external display device;

in response to determining that the current input style of the electronic device does not correspond to the first external display input style of the external display device, convert original inputs received at the electronic device using the current input style into modified inputs corresponding to the first external display input style; and communicate the modified inputs to the external display device to enable use of the first external display input style during presentation of and interaction with electronic device content displayed on the external display device.

2. The electronic device of claim 1, wherein the at least one processor is further enabled to:

in response to determining that the current input style of the electronic device corresponds to the first external display input style of the external display device, communicate the original inputs to the external display device to enable use of the first external display input style during presentation of and interaction with electronic device content displayed on the external display device.

3. The electronic device of claim 1, wherein the at least one processor is further enabled to:

detect communication with the external display device; and in response to detecting communication with the external display device:

trigger the external display device to transmit device data including the first external display input style to the electronic device; and receive the device data from the external display device.

4. The electronic device of claim 1, wherein the first external display input style comprises one of a gesture-based input style and a non-gesture-based input style.

5. The electronic device of claim 4, wherein when the first external display input style is the gesture-based input style and the current input style is the non-gesture-based input style, the original inputs received via the non-gesture-based input style are converted to the modified inputs corresponding to the gesture-based input style.

6. The electronic device of claim 4, wherein when the first external display input style is the non-gesture-based input style and the current input style is the gesture-based input style, the original inputs received via the gesture-based input style are converted to the modified inputs corresponding to the non-gesture-based input style.

7. The electronic device of claim 1, wherein the at least one processor is further enabled to:

monitor if the first external display input style of the external display device changes to a second external display input style;

in response to the first external display input style of the external display device being changed to the second external display input style, determine if the second external display input style corresponds to the current input style of the electronic device;

in response to determining that the second external display input style does not correspond to the current input style of the electronic device, convert original inputs received at the electronic device using the current input style into modified inputs corresponding to the second external display input style; and communicate the modified inputs to the external display device to enable use of the second external display input style during presentation of and interaction with electronic device content displayed on the external display device.

8. The electronic device of claim 1, wherein the external display device comprises at least one of:

an external monitor;

a display device of a laptop device; and a display device of a tablet device.

9. A method comprising:

identifying, via a processor, from device data received from an external display device via a communication device, a first external display input style of the external display device;

determining if a current input style of an electronic device corresponds to the first external display input style of the external display device;

in response to determining that the current input style of the electronic device does not correspond to the first external display input style of the external display device, converting original inputs received at the electronic device using the current input style into modified inputs corresponding to the first external display input style; and communicating the modified inputs to the external display device to enable use of the first external display input style during presentation of and interaction with electronic device content displayed on the external display device.

10. The method of claim 9, further comprising:

in response to determining that the current input style of the electronic device corresponds to the first external display input style of the external display device, communicating the original inputs to the external display device to enable use of the first external display input style during presentation of and interaction with electronic device content displayed on the external display device.

11. The method of claim 9, further comprising:

detecting communication with the external display device;

in response to detecting communication with the external display device, triggering the external display device to transmit device data including the first external display input style to the electronic device; and receiving the device data from the external display device.

12. The method of claim 9, wherein the first external display input style comprises one of a gesture-based input style and a non-gesture-based input style.

13. The method of claim 12, wherein when the first external display input style is the gesture-based input style and the current input style is the non-gesture-based input style, the original inputs received via the non-gesture-based input style are converted to the modified inputs corresponding to the gesture-based input style.

14. The method of claim 12, wherein when the first external display input style is the non-gesture-based input style and the current input style is the gesture-based input style, the original inputs received via the gesture-based input style are converted to the modified inputs corresponding to the non-gesture-based input style.

15. The method of claim 9, further comprising:

monitoring if the first external display input style of the external display device changes to a second external display input style;

in response to the first external display input style of the external display device being changed to the second external display input style, determining if the second external display input style corresponds to the current input style of the electronic device;

in response to determining that the second external display input style does not correspond to the current input style of the electronic device, converting original inputs received at the electronic device using the current input style into modified inputs corresponding to the second external display input style; and communicating the modified inputs to the external display device to enable use of the second external display input style during presentation of and interaction with electronic device content displayed on the external display device.

16. The method of claim 9, wherein the external display device comprises at least one of:

an external monitor;
a display device of a laptop device; and
a display device of a tablet device.

17. A computer program product comprising:

a non-transitory computer readable storage device having stored thereon program code which, when executed by at least one processor of an electronic device having a communication device and a memory, enables the electronic device to complete the functionality of:

identifying from device data received from an external display device via the communication device, a first external display input style of the external display device;

determining if a current input style of an electronic device corresponds to the first external display input style of the external display device;

in response to determining that the current input style of the electronic device does not correspond to the first external display input style of the external display device, converting original inputs received at the electronic device using the current input style into modified inputs corresponding to the first external display input style; and communicating the modified inputs to the external display device to enable use of the first external display input style during presentation of and interaction with electronic device content displayed on the external display device.

18. The computer program product of claim 17, wherein the program code for converting original inputs into modified inputs comprises program code that further enables the electronic device to complete the functionality of:

in response to determining that the current input style of the electronic device corresponds to the first external display input style of the external display device, communicating the original inputs to the external display device to enable use of the first external display input style during presentation of and interaction with electronic device content displayed on the external display device.

19. The computer program product of claim 17, wherein the program code for converting original inputs into modified inputs comprises program code that further enables the electronic device to complete the functionality of:

detecting communication with the external display device;

in response to detecting communication with the external display device, triggering the external display device to transmit device data including the first external display input style to the electronic device; and receiving the device data from the external display device.

20. The computer program product of claim 17, wherein the first external display input style comprises one of a gesture-based input style and a non-gesture-based input style.

\* \* \* \* \*